(12) United States Patent
Hyun et al.

(10) Patent No.: US 12,407,917 B2
(45) Date of Patent: Sep. 2, 2025

(54) ELECTRONIC DEVICE AND METHOD FOR GENERATING IMAGE BY APPLYING EFFECT TO SUBJECT AND BACKGROUND

(71) Applicant: Samsung Electronics Co., Ltd., Suwon-si (KR)

(72) Inventors: Daeyoung Hyun, Suwon-si (KR); Changhoon Kim, Suwon-si (KR); Byeongyong Ahn, Suwon-si (KR); Seulki Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 153 days.

(21) Appl. No.: 18/105,331

(22) Filed: Feb. 3, 2023

(65) Prior Publication Data

US 2023/0188831 A1 Jun. 15, 2023

Related U.S. Application Data

(63) Continuation of application No. PCT/KR2021/009727, filed on Jul. 27, 2021.

(30) Foreign Application Priority Data

Aug. 4, 2020 (KR) .................. 10-2020-0097491

(51) Int. Cl.
*H04N 23/63* (2023.01)
*H04N 23/611* (2023.01)
*H04N 23/74* (2023.01)

(52) U.S. Cl.
CPC ......... *H04N 23/632* (2023.01); *H04N 23/611* (2023.01); *H04N 23/74* (2023.01)

(58) Field of Classification Search
CPC .... H04N 23/632; H04N 23/611; H04N 23/74; H04N 9/74; G06T 7/11; G06T 7/194; G06T 7/90; G06T 15/50; G06T 2207/10024
See application file for complete search history.

(56) References Cited

U.S. PATENT DOCUMENTS

| 10,171,744 B2 | 1/2019 | Kitajima |
| 10,181,210 B2 | 1/2019 | Lee et al. |

(Continued)

FOREIGN PATENT DOCUMENTS

| JP | 2013149219 A | 8/2013 |
| JP | 2013171433 A | 9/2013 |

(Continued)

OTHER PUBLICATIONS

International Search Report with Written Opinion for International Application No. PCT/KR2021/009727; International Filing Date Jul. 27, 2021; Date of Mailing Nov. 11, 2021; 57 pages.

(Continued)

*Primary Examiner* — Twyler L Haskins
*Assistant Examiner* — John H Morehead, III
(74) *Attorney, Agent, or Firm* — CANTOR COLBURN LLP

(57) ABSTRACT

At least one processor included in an electronic device may execute a camera, detect at least one object based on image data obtained through the camera in a first light source environment, analyze color properties of the detected at least one object, determine a first effect based on the analyzed color properties of the object, apply a second light source effect to the at least one object, the second light source effect being different from the first light source, and apply the first (Continued)

effect to a background except the at least one object. Various other embodiments identified through the specification are possible.

20 Claims, 11 Drawing Sheets

(56) References Cited

U.S. PATENT DOCUMENTS

| | | | |
|---|---|---|---|
| 10,482,346 | B2 | 11/2019 | Kim et al. |
| 10,528,243 | B2 | 1/2020 | Manzari et al. |
| 10,740,959 | B2 | 8/2020 | Johnson et al. |
| 11,263,469 | B2 | 3/2022 | Kim et al. |
| 12,079,974 | B2 | 9/2024 | Li et al. |
| 2006/0182367 | A1 | 8/2006 | Moghaddam |
| 2016/0112654 | A1* | 4/2016 | Seo .................. G01J 3/463 348/333.12 |
| 2017/0228867 | A1* | 8/2017 | Baruch ................. G06T 7/12 |
| 2017/0337693 | A1* | 11/2017 | Baruch ................. G06T 7/12 |
| 2018/0349008 | A1* | 12/2018 | Manzari .............. H04N 23/632 |
| 2019/0080508 | A1* | 3/2019 | Johnson .............. H04N 23/631 |
| 2019/0364201 | A1 | 11/2019 | Hirai et al. |
| 2020/0204775 | A1 | 6/2020 | Kitajima |

FOREIGN PATENT DOCUMENTS

| | | | |
|---|---|---|---|
| JP | 6287102 | B2 | 3/2018 |
| JP | 6700840 | B2 | 5/2020 |
| KR | 20140134844 | A | 11/2014 |
| KR | 20160016574 | A | 2/2016 |
| KR | 20160021607 | A | 2/2016 |
| KR | 20160144851 | A | 12/2016 |
| KR | 20190142397 | A | 12/2019 |
| KR | 20200043432 | A | 4/2020 |
| KR | 102140295 | B1 | 7/2020 |
| WO | 2018226264 | A1 | 12/2018 |
| WO | 2020078026 | A1 | 4/2020 |

OTHER PUBLICATIONS

Korean Office Action corresponding to Application No. KR10-2020-0097491; Issue Date Aug. 22, 2024.

* cited by examiner

ELECTRONIC DEVICE AND METHOD FOR GENERATING IMAGE BY APPLYING EFFECT TO SUBJECT AND BACKGROUND

CROSS-REFERENCE TO RELATED APPLICATIONS

This application is a continuation of International Application No. PCT/KR2021/009727 designating the United States, filed on Jul. 27, 2021, in the Korean Intellectual Property Receiving Office and claiming priority to Korean Patent Application No. 10-2020-0097491, filed on Aug. 4, 2020, in the Korean Intellectual Property Office, the disclosures of all of which are incorporated by reference herein in their entireties.

TECHNICAL FIELD

Embodiments disclosed in this document relate to an electronic device and a method for applying light source effects or color effects to an image captured by a camera.

BACKGROUND ART

Taking selfies using a front camera of a portable electronic device is on the rise, and a function of applying various image effects to a selfie image is required to satisfy various personalities of people taking a picture.

As the demand for image effects increases as described above, manufacturers of portable electronic devices and application developers thereof are developing and applying various image effects. A method of applying image effects includes a method of applying effects stored in a portable electronic device to the entire preview image and a method of applying various effects to a captured and stored image through an editing function.

DISCLOSURE OF INVENTION

Technical Problem

In the past, desired image effects were simply applied through user input, and even when a light source effect is desired to be changed, the direction of a desired light source and the intensity of a light source are applied through user input.

In addition, since virtual light source effects or color effects are simply applied to the foreground or one effect is applied to the entire image including a foreground and a background in the existing technology, there is a limit to applying the effects separately to the foreground and the background.

Solution to Problem

Various embodiments of the disclosure may provide an electronic device that applies a virtual light source effect suitable for an object by analyzing the characteristics of a light source applied during photographing and applies a color effect different from the light source effect to a background, and a method for controlling the electronic device.

An electronic device according to an embodiment disclosed in this document may include a camera and at least one processor electrically connected to the camera. The at least one processor may execute the camera, detect at least one object, based on image data obtained through the camera in a first light source environment, analyze color properties of the at least one detected object, determine a first effect, based on the analyzed color properties of the object, apply a second light source effect different from the first light source to the at least one object, and apply the first effect to a background, excluding the at least one object.

In addition, a method of operating an electronic device according to an embodiment disclosed in this document may include executing a camera, detecting at least one object, based on image data obtained through the camera in a first light source environment, analyzing color properties of the at least one detected object, determining a first effect, based on the analyzed color properties of the object, applying a second light source effect different from the first light source to the at least one object, and applying the first effect to a background, excluding the at least one object.

In addition, an electronic device according to an embodiment disclosed in this document may include a camera and at least one processor electrically connected to the camera. The at least one processor may execute the camera, detect at least one object, based on image data obtained through the camera in a first light source environment, analyze properties of the at least one detected object, determine at least one or more light source effects, based on the analyzed properties of the object, apply a second light source effect different from the first light source to the at least one object, and apply a third light source effect different from the second light source effect to a background, excluding the at least one object.

Advantageous Effects of Invention

According to various embodiments disclosed in this document, effects may be applied separately to a foreground and a background of an image, thereby producing more diverse images.

In addition, according to various embodiments, different effects may be applied to the foreground and the background of an image, respectively, thereby providing an unusual image.

In addition, according to various embodiments, it is possible to apply optimized effects to the foreground and the background of an image, respectively.

In addition, various effects identified directly or indirectly through this document may be provided.

BEST MODE FOR CARRYING OUT THE INVENTION

Hereinafter, various embodiments of this document will be described with reference to the accompanying drawings. However, this is not intended to limit the document to specific embodiments, and should be understood to include various modifications, equivalents, and/or alternatives of the embodiments of the disclosure.

Figure 1:
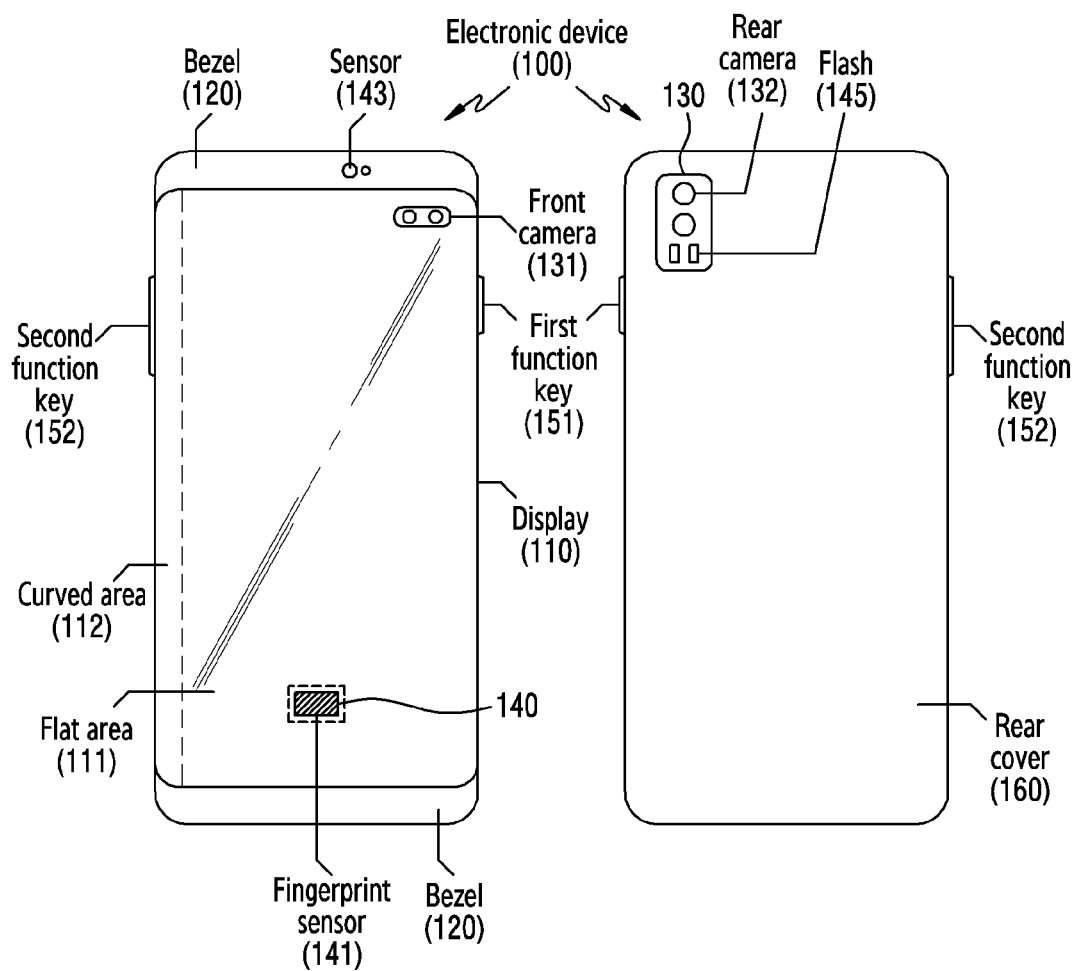
FIG. 1 illustrates an electronic device according to an embodiment.

FIG. 1 illustrates an electronic device according to an embodiment.

Referring to FIG. 1, a display 110 may be disposed on a front surface of an electronic device 100 according to an embodiment. According to an embodiment, the display 110 may occupy most of the front surface of the electronic device 100. The display 110 and an area of a bezel 120 surrounding at least some edges of the display 110 may be disposed on the front surface of the electronic device 100. In the example in FIG. 1, the display 110 may include a flat area 111 and a curved area 112 extending from the flat area 111 toward the side surface of the electronic device 100. Although the curved area 112 is provided only on one side (e.g., the left side) in FIG. 1, it may be understood that the curved area may also be formed on the opposite side in the same manner. In addition, the electronic device 100 illustrated in FIG. 1 is only an example, and various embodiments may be possible. For example, the display 110 of the electronic device 100 may include only the flat area 111 without the curved area 112 or may be equipped with the curved area 112 only on one edge rather than both sides. In addition, according to an embodiment, the curved area may extend to the rear surface of the electronic device 100 so that the electronic device 100 may have an additional flat area. In still further embodiments, no curved areas may be provided on an electric device of the present disclosure. As such, the specific geometric shape and profile of the electronic device is not intended to be limiting to the scope of the present disclosure.

According to an embodiment, a fingerprint sensor 141 for recognizing fingerprints of a user may be included in a first area 140 of the display 110. Since the fingerprint sensor 141 is disposed on a lower layer of the display 110, it may not be visible to the user or may be arranged to be difficult to view or visually observe. In addition, a sensor for user/biometric authentication may be further disposed in some areas of the display 110 in addition to the fingerprint sensor 141 (or alternatively thereto). In another embodiment, a sensor for user/biometric authentication may be disposed in one area of the bezel 120. For example, an IR sensor for facial or iris authentication may be exposed through one area of the display 110 or exposed through one area of the bezel 120.

According to an embodiment, a front camera 131 may be disposed on the front surface of the electronic device 100. Although the front camera 131 is shown as being exposed through one area of the display 110 in the embodiment in FIG. 1, the front camera 131 may be exposed through the bezel 120 in another embodiment or may be positioned at other location on the front surface of the electronic device 100.

According to an embodiment, the electronic device 100 may include one or more front cameras 131. For example, the electronic device 100 may include two front cameras such as a first front camera and a second front camera. According to an embodiment, the first front camera and the second front camera may be the same type of camera having the same specifications (e.g., pixels). In other embodiments, the first front camera and the second front camera may be implemented as cameras having different specifications. In some embodiments, the two front cameras may share some similar specifications/properties, while other aspects specifications/properties of the two front cameras may be different to enable one or more functionalities. For example, the electronic device 100 may support functions related to a dual camera (e.g., 3D shooting, auto focus, etc.) through the two front cameras.

According to an embodiment, a rear camera 132 may be disposed on the rear surface of the electronic device 100. The rear camera 132 may be exposed through a camera area 130 of a rear cover 160. According to an embodiment, the electronic device 100 may include a plurality of rear cameras disposed in the camera area 130. For example, the electronic device 100 may include two or more rear cameras. For example, the electronic device 100 may include a first rear camera, a second rear camera, and a third rear camera. The first rear camera, the second rear camera, and the third rear camera may have different specifications from each other. For example, the first rear camera, the second rear camera, and/or the third rear camera may be different from one another in field of view (FOV), pixels, aperture, support or non-support of optical zoom/digital zoom, support or non-support of an image stabilization function, the type of lens set included in each camera, and arrangement thereof. For example, the first rear camera may be a normal camera, the second rear camera may be a camera for a wide photographing (e.g., wide FOV), and the third rear camera may be a camera for a telephoto photographing (e.g., narrow FOV, zoom capability, etc.). In this document, the description of the functions or characteristics of the front camera may be applied to the rear camera, and vice versa.

According to an embodiment, various types of hardware or sensors assisting photographing, such as a flash 145, may be disposed in the camera area 130. For example, in some non-limiting embodiments, a distance sensor (e.g., a time-of-flight (TOF) sensor) for detecting a distance between a subject and the electronic device 100 may be included.

According to an embodiment, at least one physical key, button, toggle, or the like may be disposed on the side surface of the electronic device 100. For example, a first function key 151, such as for turning on/off the display 110 or turning on/off the electronic device 100, may be disposed on the right edge of the electronic device 100, based on the front surface thereof. According to an embodiment, a second function key 152, such as for controlling the volume or screen brightness of the electronic device 100, may be disposed on the left edge of the electronic device 100, with respect to the front surface thereof. In addition to this, additional buttons or keys may be disposed on the side(s) and/or on the front surface or the rear surface of the electronic device 100. For example, a physical button or a touch button mapped to a specific function may be disposed on a lower area of the front bezel 120.

The electronic device 100 illustrated in FIG. 1 is only an example and is not intended to limit the form of the device to which the technical idea disclosed in this document is applied. The technical idea disclosed in this document may be applicable to various user devices equipped with a first camera module facing in a first direction and a second camera module facing in a direction different from the first direction. For example, the technical idea disclosed in this document may be applied to a foldable electronic device, a tablet, or a laptop capable of being folded in the horizontal or vertical direction by employing a flexible display 110 and a hinge structure. In addition, the technical idea may also be applied to the case in which a first camera module and a second camera module, which face in the same direction, may be disposed to face in different directions by rotation, folding, or deforming of the device.

Hereinafter, for the convenience of description, various embodiments will be described based on the electronic device 100 shown in FIG. 1.

Figure 2:
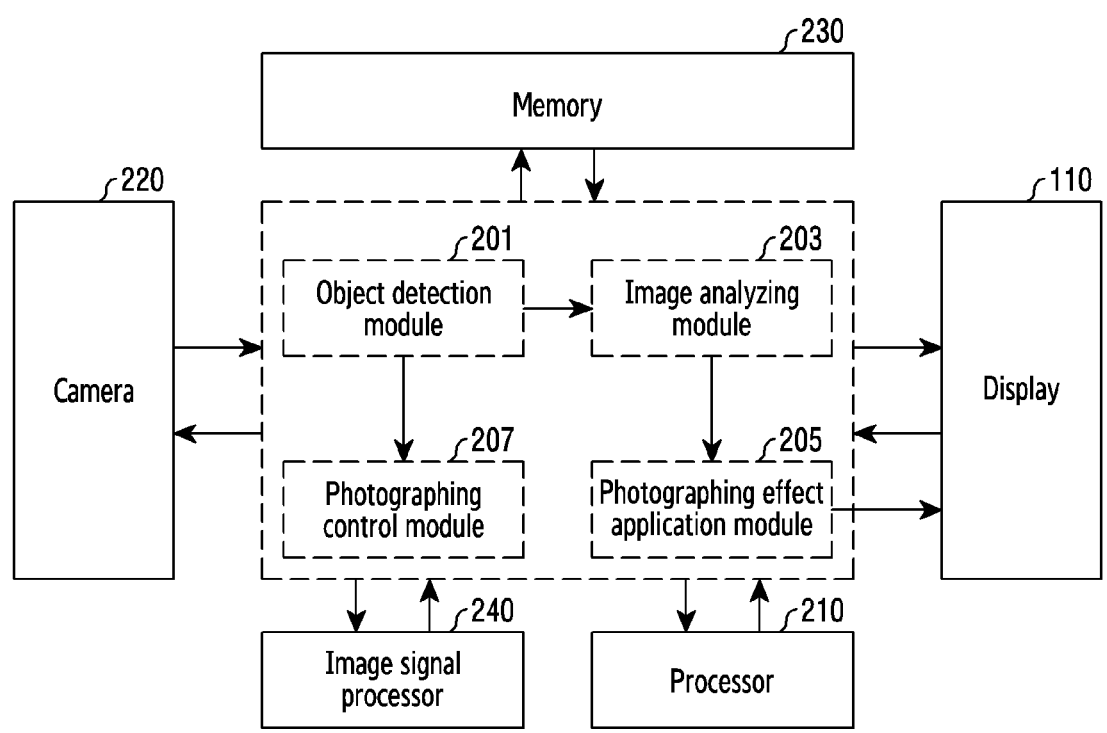
FIG. 2 illustrates a concept of controlling a function for applying an effect to an image in an electronic device according to an embodiment.

FIG. 2 illustrates a concept of controlling a function for applying an effect to an image in an electronic device according to an embodiment. In a description of FIG. 2, configurations and/or functions described in FIG. 1 may be simply described or omitted.

Referring to FIG. 2, the electronic device 100 may use hardware and/or software modules to support functions for applying effects to images. For example, a processor 210 may execute instructions stored in the memory 230, thereby operating an object detection module 201, an image analyzing module 203, a photographing effect application module 205, and a photographing control module 207. In various embodiments, software modules other than those shown in FIG. 2 may be implemented. For example, at least two modules may be integrated into a single module, or a single module may be divided into two or more modules. In addition, hardware and software modules may share a single function, thereby improving work performance. For example, the electronic device 100 may include both an encoder implemented as hardware and an encoder implemented as software module, and some of data obtained through at least one camera module may be processed in the hardware encoder and the remaining data may be processed in the software encoder.

According to an embodiment, the object detection module 201 may detect an object by analysis of image data obtained through a camera 220. The object detection module 201 may perform detection of a face, detection of face-related parts (e.g., eyes, nose, mouth, ears, hair, etc.), detection of a body, detection of body-related parts (e.g., arms, legs, neck, torso, etc.), and detection of gestures. The object may also include animals as well as humans, and may also include things such as a doll or other humanoid shapes or objects.

According to an embodiment, the object detection module 201 may detect at least one object through various detection methods. The object detection module 201 may detect an object using artificial intelligence such as machine learning. For example, a body may be detected through a segmentation technique (e.g., upper body segmentation). The various detection methods are not limited to a specific method and may include various methods previously disclosed. For example, various types of object detection algorithms and/or libraries may be implemented by the object detection module 201, without departing from the scope of the present disclosure.

According to an embodiment, if a specific gesture is detected, the object detection module 201 may transfer information about the specific gesture to the photographing control module 207.

According to an embodiment, the image analyzing module 203 may analyze color properties of an object and a background included in the image. The image analyzing module 203 may detect at least one of a number of detected objects, positions of the detected objects, sizes of the detected objects, shapes of the detected objects, colors of the detected objects, angles of the detected objects, and/or other properties and/or characteristics of the detected objects. The image analyzing module 203 may detect, for example and without limitation, photographing positions, complexity of a background, color saturation of an image, and contrast of an image. The image analyzing module 203 may estimate the properties of a light source by analyzing the image. The image analyzing module 203 may estimate the direction of a light source and the intensity of a light source by analyzing the image.

According to an embodiment, the photographing effect application module 205 may apply various effects to the image. For example, the various effects may include, without limitation, virtual light source effects and virtual color effects. The photographing effect application module 205 may apply the effects to a preview image currently being displayed on the display 110 or apply the effects to the images stored in the memory 230. The photographing effect application module 205 may automatically apply the effects to the image or apply, in response to a user input, an effect corresponding to the user input to the image.

According to an embodiment, the photographing control module 207 may provide a user interface (UI)/graphical UI (GUI) related to the camera to the user through the display 110. In addition, a photographing operation may be controlled in response to a user input provided through the UI/GUI output to the display 110. For example, the photographing control module 207 may obtain a recording start/stop input from the user and transfer the obtained recording start/stop input to an encoder. The input obtained from the user may include an input obtained through a voice recognition function or include detection of a specific gesture. For example, if the processor 210 recognizes voices such as "shoot", "photograph", and "stop photographing", the processor 210 may start/stop photographing in response thereto. Alternatively, if the processor 210 detects a gesture showing a palm, the processor 210 may start/stop photographing in response thereto.

According to an embodiment, the display 110 may display an execution screen of an application executed by the processor 210 or content such as images and/or videos stored in the memory 230 on the display 110. In addition, the processor 210 may display image data obtained through the camera 220 on the display 110 in real time. The display 110 may output, as a preview image, a preview area cropped and/or resized to conform to resolution of the current preview image.

According to an embodiment, the image signal processor 240 may perform a stabilization operation on the images obtained from the camera 220. According to an embodiment, the stabilization operation may include at least one of auto exposure (AE), auto focus (AF), and auto white balance (AWB). In addition, the image signal processor 240 may improve the quality of an obtained image through an appropriate picture quality control/tuning operation, in addition to the auto exposure, the auto focus, and/or the auto white balance, or apply a desired effect thereto.

In the embodiment in FIG. 2, the functions performed by the object detection module 201, the image analyzing module 203, the photographing effect application module 205, and the photographing control module 207 may be understood to be performed by the processor 210 executing instructions stored in the memory 230. In addition, in various embodiments, the electronic device 100 may use one or more hardware processing circuits in order to perform various functions and operations disclosed in this document. For example, an application processor (AP) included in the mobile device, an image signaling processor (ISP) mounted to a camera module, a display driver integrated circuit (DDIC), a touch integrated circuit (IC), a communication processor (CP), a hardware encoder, and the like may be used to implement various embodiments disclosed in this document. In addition, the connection relationship between the hardware and software shown in FIG. 2 is intended for the convenience of description, and the flow/direction of data or commands are not limited thereto. The elements included in the electronic device 100 may have various electrical/operational connection relationships.

Figure 3:
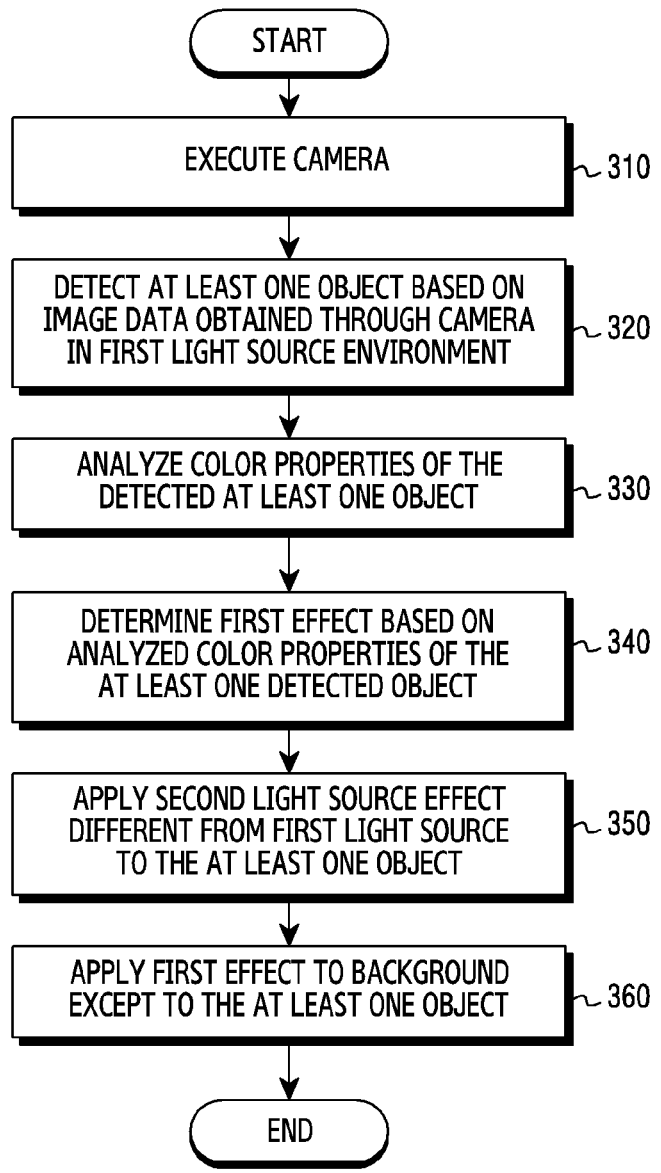
FIG. 3 illustrates a process of separating an object from a background and applying different effects thereto in an electronic device according to an embodiment.

FIG. 3 illustrates a process of separating an object from a background and applying different effects thereto in an electronic device according to an embodiment.

In operation 310 according to an embodiment, the processor 210 may execute the camera 220. For example, the processor 210 may execute the camera 220 in response to a user input. The user input may include at least one of a user input pressing a virtual photographing button displayed on the display 110, a user input pressing a physical photographing button, a user input using a voice recognition function, and an instruction sent from a peripheral device (e.g., wearable electronic watch, connected alternative device (e.g., phone, tablet, computer)).

According to an embodiment, the processor 210 may execute the camera 220 to obtain image data through an image sensor in the camera 220. The image data may obtain various color values through a color filter array. The color filter array may include an RGB color filter array. The RGB color filter array is just one example, and the color filter array may include one or more, individually or in combination, of a color filter array of an RGBE (red, green, blue, and emerald) pattern, a CYYM (cyan, yellow, and magenta) pattern, a CYGM (cyan, yellow, green, and magenta) pattern, or an RGBW (red, green, blue, and white) pattern.

In operation 320 according to an embodiment, the processor 210 may detect at least one object, based on image data obtained through the camera 220 in a first light source environment. The first light source environment may be understood as an external environment of the electronic device 100 during the photographing, instead of a light source environment produced by the electronic device 100. For example, when photographing at least one person in the first light source environment, the processor 210 may detect at least one person and distinguish at least one part (e.g., a face or a body) of the person.

According to an embodiment, the processor 210 may analyze at least one or more of the characteristics of the object, the characteristics of an image, and the characteristics of a light source detected based on the image data obtained through the camera 220 in the first light source environment. For example, the processor 210, based on the obtained image data, may identify a photographing place, the complexity of a background, the number of detected objects (e.g., people and/or animals), the saturation of an image, and the contrast of an image. As another example, the processor 210 may identify at least one of the position, the gender, the age, the facial expression, the angle of a face, the photographing pose, the facial size and shape, the skin, the hair, the clothes, the eyes, and the lip color of a detected person. As another example, the processor 210 may identify at least one of the direction and the intensity of a light source.

In operation 330 according to an embodiment, the processor 210 may analyze color properties of at least one detected object. For example, an area related to the object may be distinguished, and a color value for the area related to the object may be analyzed. For example, a skin color may be obtained from the face of a person, a black color may be obtained from the hair of a person, and the color of clothes may be obtained from the clothes worn on a person, and information about the colors may be stored in the memory 230.

According to an embodiment, the processor 210 may determine an area having the largest proportion (e.g., area) among the areas related to the object. The processor 210 may obtain a color value of the area having the largest proportion of the object. For example, if the processor 210 detects a face of a person and an upper body of a person, and if the upper body has the largest proportion in the image, the color of the clothes corresponding to the upper body may be obtained.

According to an embodiment, the processor 210 may obtain the color of a partial area (e.g., the clothes worn on the upper body) of the detected object (e.g., a person), regardless of the proportion. For example, if the color (e.g., purple) of the clothes worn on the detected person is identified, the processor 210 may obtain the color of the clothes and store information about the color in the memory 230.

In operation 340 according to an embodiment, the processor 210 may determine a first effect, based on the color properties of the analyzed object. For example, a purple color effect may be determined based on the color (e.g., purple) of the clothes that is a part of the analyzed object (e.g., a person). Operation 340 will be described in detail below with respect to operation 441, operation 443, and operation 446 in FIG. 4.

In operation 350 according to an embodiment, the processor 210 may apply a second light source effect, which is different from the first light source, to at least one object detected in the image. The processor 210 may determine a second light source effect, based on the properties of the first light source, applied to the object. Alternatively, the processor 210 may randomly determine a second light source different from the first light source. The processor 210 may apply the second light source effect to at least one object. Operation 350 will be described in detail below with respect to operation 453 in FIG. 4.

According to an embodiment, the processor 210 may remove the effect of the first light source from at least one object. The processor 210 may remove the effect of the first light source and apply the second light source effect to at least one object.

In operation 360 according to an embodiment, the processor 210 may apply the first effect to a background, excluding the at least one object. The processor 210 may produce an image by applying the first effect to the background. The first effect may be a color effect in which a color value is adjusted or a light source effect in which a light source is adjusted. For example, if purple is determined as the first color effect, based on the color properties of the object, the processor 210 may apply purple as a background color.

According to an embodiment, the processor 210 may remove the effect of the first light source from the background. The processor 210 may remove the effect of the first light source and apply the first effect to the background.

Figure 4:
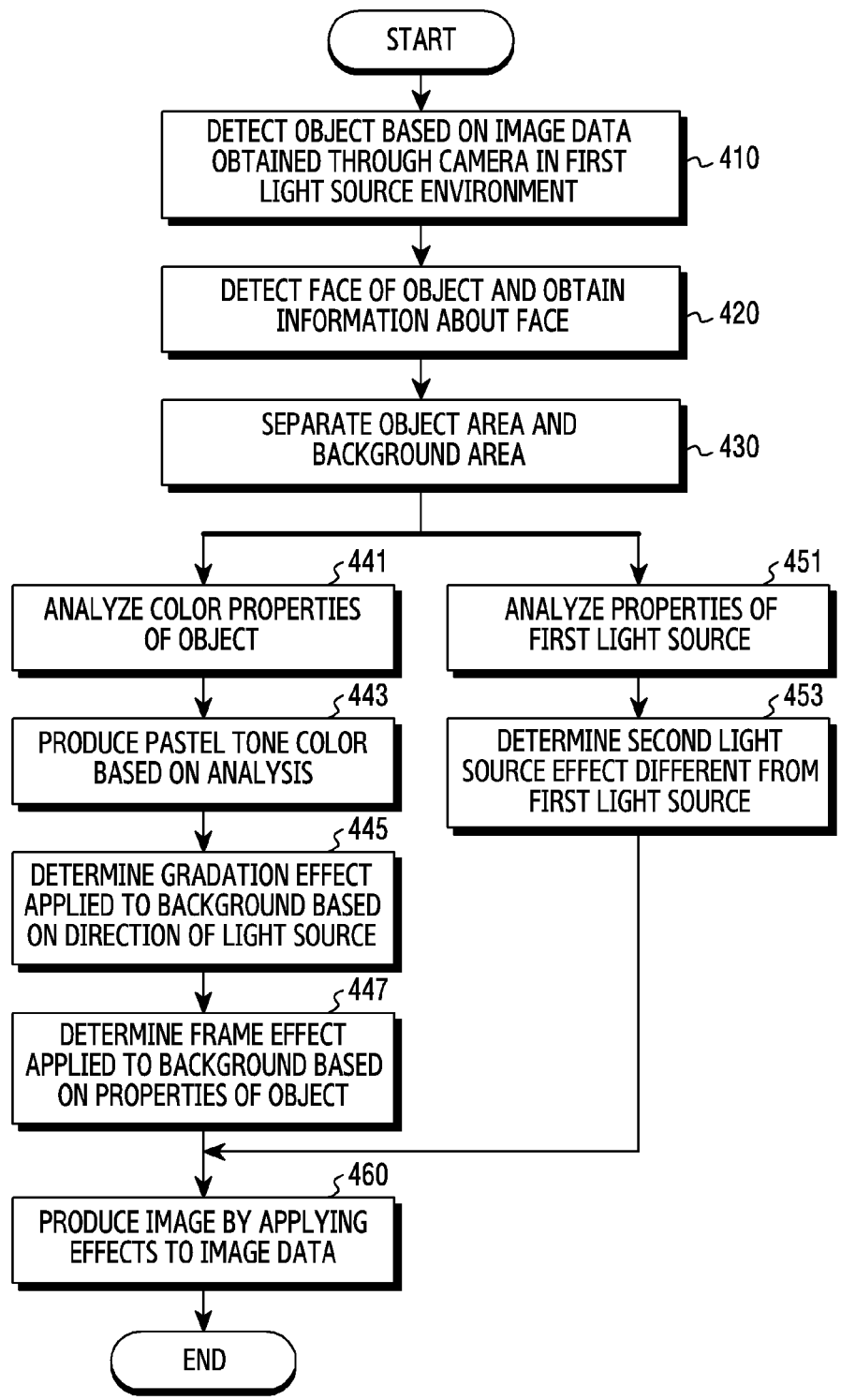
FIG. 4 illustrates a process of separating an object from a background and applying different effects thereto in an electronic device according to an embodiment.

FIG. 4 illustrates a process of separating an object from a background and applying different effects thereto in an electronic device according to an embodiment.

In operation 410 according to an embodiment, the processor 210 may detect an object, based on image data obtained through the camera in a first light source environment. Since operation 410 corresponds to operation 320 in FIG. 3, a detailed description thereof will be omitted.

In operation 420 according to this illustrative non-limiting embodiment, the processor 210 may detect a face of the object and obtain information about the face. Although the present description is made with respect to a face of the object, it will be appreciated that other parts or aspects of the object may be the focus of the process of FIG. 4. The processor 210 may obtain information about the face in order to determine whether or not predetermined conditions are fulfilled. If the conditions are fulfilled, the processor 210 may apply an effect to an image. The processor 210 may determine whether or not the size of the face, the angle of the face, and the direction of the face fulfill predetermined conditions.

For example, and without limitation, according to an embodiment, the processor 210 may determine a facial area corresponding to the face. The processor 210 may configured to information about the direction of the face, and determine the angle of the face between the direction of the face and a reference direction. If the determined facial area is greater than or equal to a predetermined area of the obtained image data and if the angle of the face is less than or equal to a predetermined angle, the processor 210 may determine that the conditions for applying an effect to an image is fulfilled. For example, the processor 210 may determine whether the determined facial area is ⅓ of the obtained image data or more and whether the angle of the face falls within about −30° to about +30° in a yaw direction, within about −30° to about +30° in a roll direction, and within about −30° to about +30° in a pitch direction.

In operation 430 according to an embodiment, the processor 210 may separate an object area and a background area. The processor 210 may separate an object area and a background area through a segmentation technique (e.g., upper body segmentation). The processor 210 may compare color values around the area corresponding to the edge of the detected object and separate the object area and the background area, based on differences between the color values.

In operation 441 according to an embodiment, the processor 210 may analyze the color properties of the object. The processor 210 may obtain a color value of a partial area of the object by analyzing the color properties of the object. For example, the processor 210 may obtain a color value of the clothes worn on the upper body that is a partial area of the object (e.g., a person).

In operation 443 according to an embodiment, the processor 210 may produce a pastel tone color, based on the analysis of the color properties of the object. For example, the processor 210 may determine the color properties (e.g., the color of the clothes worn on a person) of an object (e.g., a person) and calculate the color, thereby determining a pastel tone color to be applied to the background. For example, the processor 210 may convert the detected color of clothes into pastel tone using the following pastel tone conversion formula, thereby determining a pastel tone color to be applied to the background.

$$A = \begin{bmatrix} R_i \\ G_i \\ B_i \end{bmatrix} + B = \begin{bmatrix} R_o \\ G_o \\ B_o \end{bmatrix}$$

where $$A = \begin{bmatrix} 0.060879 & -0.10606 & -0.17844 \\ 0.05503 & 0.40515 & -0.16873 \\ -0.10489 & -0.01450 & 0.41827 \end{bmatrix}$$

$$B = \begin{bmatrix} 144.215 \\ 136.271 \\ 126.797 \end{bmatrix}$$

In operation 445 according to an embodiment, the processor 210 may determine a gradation effect applied to the background, based on the direction of a light source. For example, if the direction of a light source is from the right to the left, the gradation effect may be darker on the right side and lighter on the left side. If the direction of a light source is from the top to the bottom, the gradation effect may be darker on the top and lighter on the bottom.

In operation 447 according to an embodiment, the processor 210 may determine a frame effect applied to the background, based on the properties of the object. Operation 447 may be related to the third image 630 in FIG. 6, described herein. If the size of the area (e.g., face) related to the object is greater than a first size and if the position of the area (e.g., face) related to the object falls within one area of the image, the processor 210 may determine a frame effect. The frame effect may be applied to the outer area of the image. The processor 210 may apply the frame effect by reducing the size of a background image to which a color effect and/or a gradation effect has been applied or apply the frame effect by applying a frame image to an image to which a color effect and/or a gradation effect has been applied.

According to an embodiment, the processor 210 may adjust the frame size of the determined frame effect, based on the properties (e.g., size) of the area (e.g., face) related to the object. For example, the processor 210 may reduce the frame size if the size of the area (e.g., face) related to the object is greater than or equal to a second size, and increase the frame size if the size of the area (e.g., face) related to the object is less than the second size.

According to an embodiment, the processor 210 may adjust the frame position of the determined frame effect, based on the properties (e.g., angle and/or direction) of the area (e.g., face) related to the object. For example, in the case where the face of a detected person is directed to the right, the processor 210 may determine that the right area of the frame is thicker than the left area. In the case where the face of a detected person is directed to the left, the processor 210 may determine that the left area of the frame is thicker than the right area. However, this is only an embodiment, and it may be understood by those skilled in the art that it may be applied in the opposite way.

According to an embodiment, the processor 210 may control the frame color of the determined frame effect. The processor 210 may configure the basic color of the frame as white. The processor 210 may control the frame color in order to enhance the produced pastel tone color. For example, if a background color is purplish, the processor 210 may apply a white frame effect to the image. Alternatively, if the background color is yellowish, the processor 210 may apply a black frame, instead of a white frame, such that the frame and the background are easily distinguished in color.

In operation 451 according to an embodiment, the processor 210 may analyze the properties of a first light source. The processor 210 may estimate at least one of a direction and an angle of the first light source by analyzing the properties of the first light source.

In operation 453 according to an embodiment, the processor 210 may determine a second light source effect that is different from the first light source.

According to an embodiment, the processor 210 may determine a second light source effect to be applied to the object, based on the properties of the first light source. The processor 210 may determine a second light source effect applied to the object, based on the intensity of the first light source. For example, the processor 210 may determine the contour light of a virtual front upper part that preserves the contour of the face to be the second light source effect in the case where the ISO is 800 or less and determine the light source that remains in the same direction as the first light source and increases the intensity to be the second light source effect in the case where the ISO 800 or more.

According to an embodiment, the processor 210 may randomly determine a second light source that is different from the first light source. The second light source effect may be referred to as a virtual light source effect or relighting effect. The processor 210 may determine a second light source in a direction different from that of the first light source. For example, the processor 210 may determine at least one of a second light source effect in the front direction, a second light source effect in the right direction, a second light source effect in the left direction, and a second light source effect in the edge direction of the object. The processor 210 may determine a second light source having an intensity different from that of the first light source. For example, the processor 210 may determine a second light source having the same direction as the first light source and having an increased brightness value. The processor 210 may determine a second light source having a different direction and a different intensity from the first light source.

In operation 460 according to an embodiment, the processor 210 may produce an image in which the effects are applied to the image data. The processor 210 may store the produced image in the memory 230. The processor 210 may display the produced image on the display 110.

Figure 5:
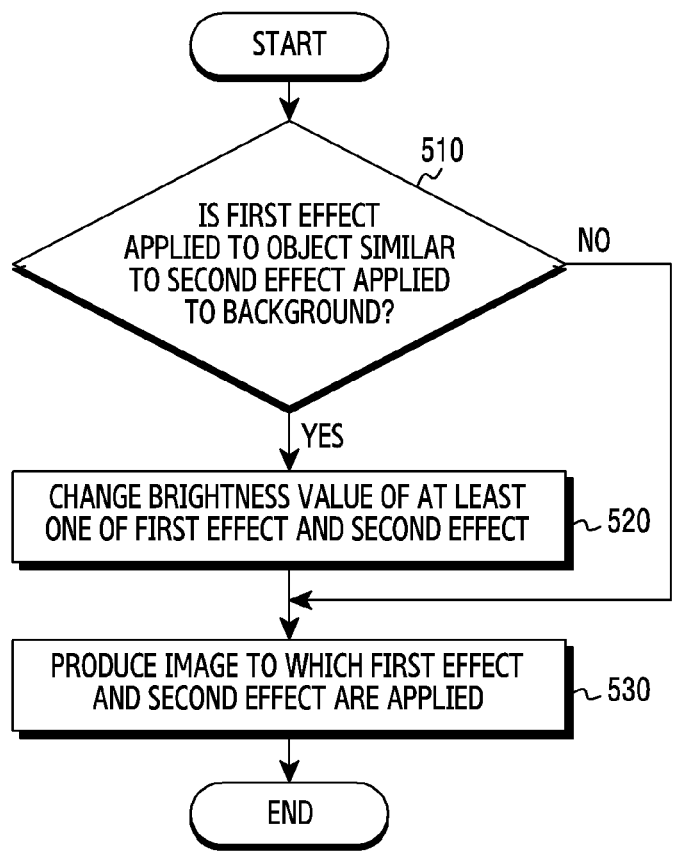
FIG. 5 illustrates an image processing process in the case where an effect applied to an object is similar to an effect applied to a background in an electronic device according to an embodiment.

FIG. 5 illustrates an image processing process in the case where an effect applied to an object is similar to an effect applied to a background in an electronic device according to an embodiment. An operating entity of the flowchart illustrated in FIG. 5 may be understood as a processor (e.g., the processor 210 in FIG. 2) or an image signal processor (the image signal processor 240 in FIG. 2). The flowchart in FIG. 5 may be related to the operations and processes of FIGS. 3 and 4. For example, in applying a color or light source effect to an object and a background in FIGS. 3 and 4, FIG. 5 shows the process in the case where the effect applied to the object and the effect applied to the background are similar.

In operation 510 according to an embodiment, the processor 210 may determine whether or not a first effect applied to the object and a second effect applied to the background are similar. The processor 210 may compare a color value of the first effect applied to the object with a color value of the second effect applied to the background, thereby determining whether or not they are similar.

According to an embodiment, if a difference between the color value of the first effect and the color value of the second effect is within a predetermined value, the processor 210 may determine that they are similar. For example, in the case where a pixel have color values of 0 to 255 for red, 0 to 255 for green, and 0 to 255 for blue, if a difference between the color value of the first effect and the color value of the second effect is within 10% in red, within 10% in green, and within 10% in blue, the color value of the first effect and the color value of the second effect may be determined to be similar. However, the predetermined value is not limited to the above examples and may be variously configured according to at least a change in a program code or a user input.

In operation 520 according to an embodiment, the processor 210 may change a brightness value of at least one of the first effect and the second effect. For example, the processor 210 may increase or reduce a brightness value of the first effect among the effects. The processor 210 may increase or reduce a color value of the second effect among the effects. The processor 210 may increase a brightness value of the first effect and reduce a brightness value of the second effect. The processor 210 may reduce a brightness value of the first effect and increase a brightness value of the second effect.

According to an embodiment, the processor 210 may randomly change a color value of at least one of the first effect and the second effect. If it is determined that the effects are similar, the processor 210 may randomly change a color value of at least one of the effects. For example, the processor 210 may change a color value of the first effect among the effects. The processor 210 may change a color value of the second effect among the effects. The processor 210 may change a color value of the first effect and a color value of the second effect.

According to an embodiment, the processor 210 may change a color value of at least one of the first effect and the second effect in response to a user input. The processor 210 may separate an object area from a background area and display the same on the display 110 such that at least one of the object area and the background area may be selected. In response to a user input for selecting the at least one area, the processor 210 may display a user interface in one area of the display 110 such that a color value of the selected area may be changed. In response to a user input for adjusting a color value of the selected area, the processor 210 may change the color value of the selected area.

In operation 530 according to an embodiment, the processor 210 may produce an image to which the first effect and the second effect are applied. The processor 210 may store the produced image in the memory 230. The processor 210 may display the produced image on the display 110.

Figure 6:
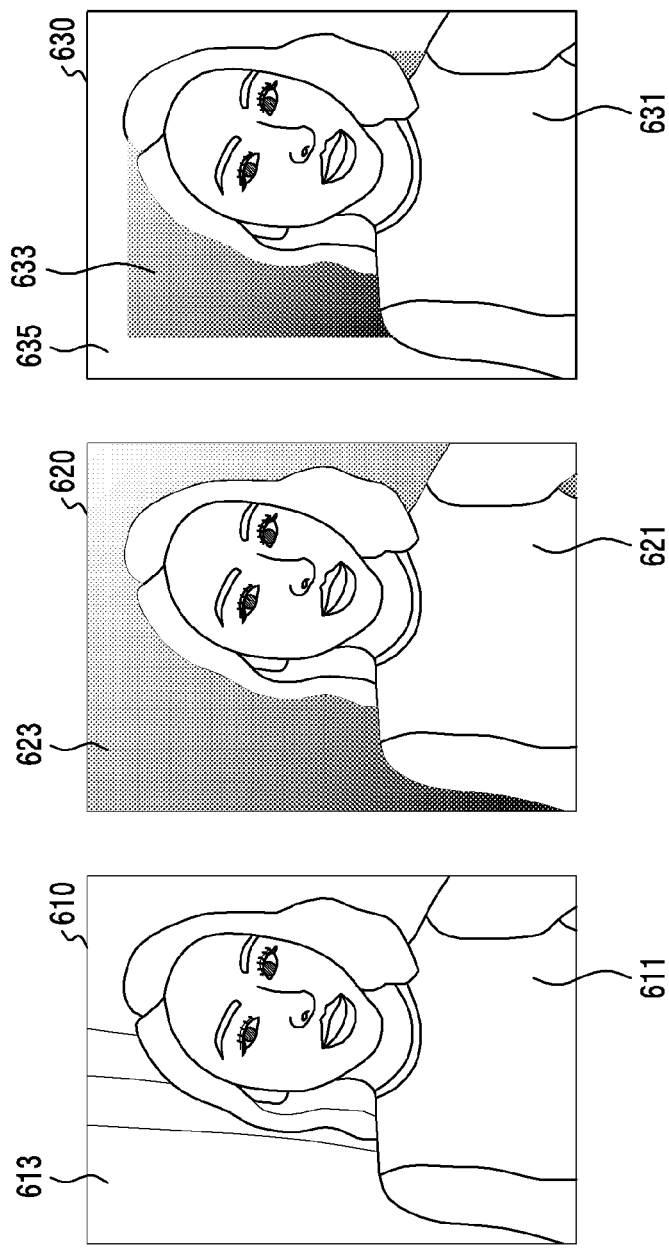
FIG. 6 illustrates the state in which an image effect is applied to image data obtained by an electronic device according to an embodiment.

FIG. 6 illustrates the state in which an image effect is applied to image data obtained by an electronic device according to an embodiment. An operating entity of the process illustrated in FIG. 6 may be understood as a processor (e.g., the processor 210 in FIG. 2 or the image signal processor 240 in FIG. 2). The images 610, 620, and 630 shown in FIG. 6 may be described as related to the description of FIG. 4.

Referring to FIG. 6, a first image 610 may be understood as a preview image including a first object 611 and a first background 613, or an image photographed and stored in the memory 230.

According to an embodiment, a second image 620 may be understood as an image including a second object 621 obtained by applying a virtual light source effect to the first object 611 and a second background 623 obtained by applying a color effect the first background 613. The virtual light source effect may be a light source that is different from the light source for photographing. The virtual light source effect may be determined based on the characteristics of the light source for photographing and the second object 621. This is described, for example, in detail in operation 350 in FIG. 3 and/or operation 453 in FIG. 4. The color effect may be determined based on color properties of the second object 621. This is described, for example, in detail in operation 340 in FIG. 3, operation 441 in FIG. 4, operation 443 in FIG. 4, and/or operation 445 in FIG. 4.

According to an embodiment, a third image 630 may be understood as an image including a third object 631, a third background 633, and a frame 635 obtained by applying a frame effect to the second image 620. The frame 635 may be determined based on the characteristics of an area (e.g., face) related to the object 631. This is described, for example, in detail in operation 447 in FIG. 4.

Figure 7:
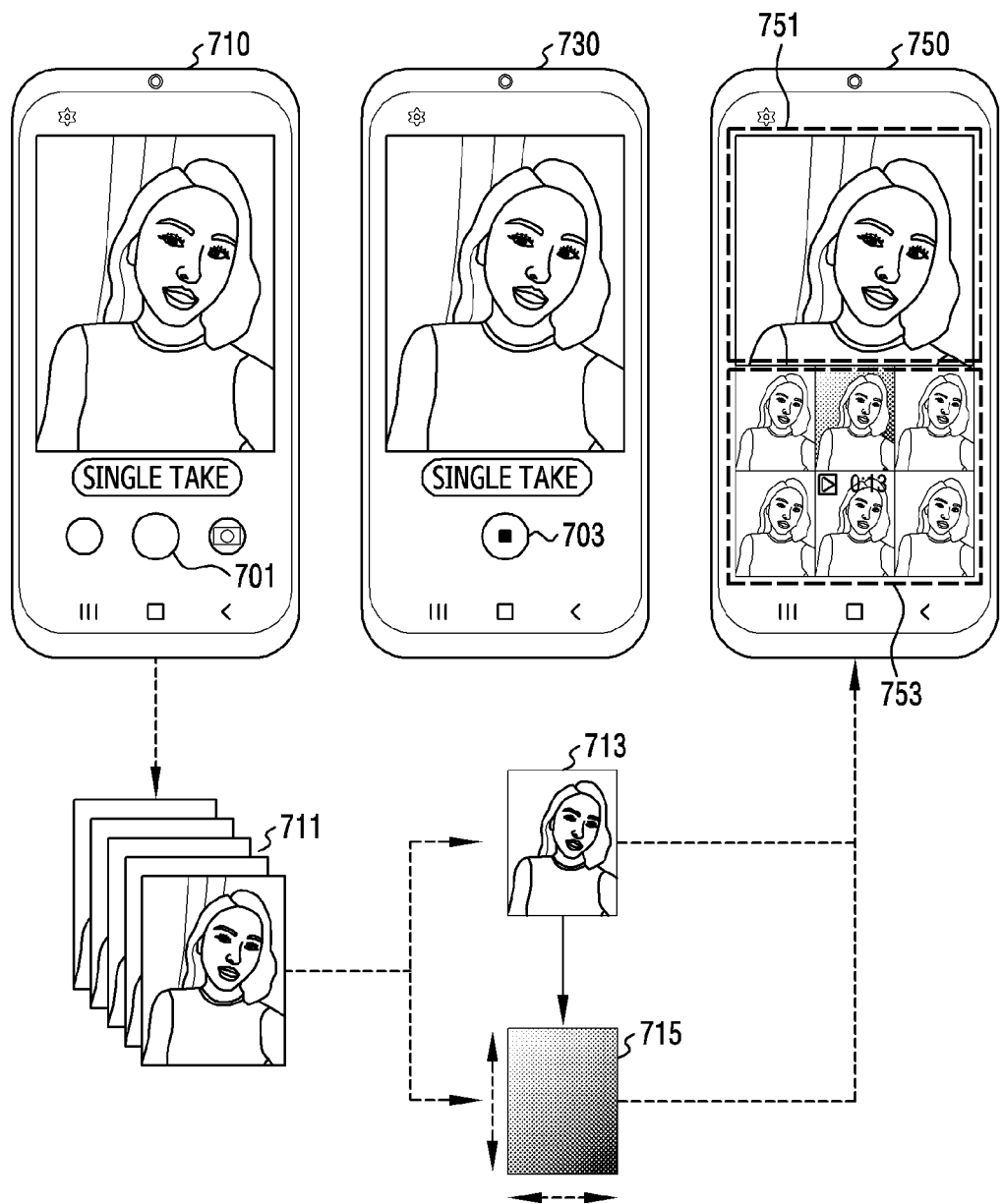
FIG. 7 illustrates a process of obtaining a plurality of images through a function of an electronic device according to an embodiment.

FIG. 7 illustrates a process of obtaining a plurality of images through a function of an electronic device according to an embodiment.

Referring to FIG. 7, the processor 210 may obtain a plurality of images through a function (e.g., a single take function) of the electronic device 100.

In step 710 according to an embodiment, the processor 210 may start recording in response to a user input received through a photographing start button 701. The processor 210 may store images for every first period (e.g., about 1 second) during the recording. For example, in the case where the processor 210 performs recording for 3 seconds in response to a user input, the processor 210 may store a first image recorded at 1 second, a second image recorded at 2 seconds, and a third image recorded at 3 seconds in the memory 230. The first period for storing the recorded images may vary according to the configuration of the user. It will be appreciated that other time intervals may be employed without departing from the scope of the present disclosure.

In step 730 according to an embodiment, the processor 210 may end the recording in response to a user input received through a photographing end button 703. In response to the user input, the processor 210 may terminate the recording and display the stored images on the display 110, based on various user interfaces.

According to an embodiment, the processor 210 may determine at least one image 713 from among a plurality of images 711 stored during the recording. The processor 210 may remove a color value of a background of the determined image.

According to an embodiment, the processor 210 may produce a color effect 715 to be applied to a background. The processor 210 may determine a color effect for a background, based on the color properties (e.g., color of clothes) of an object included in the at least one determined image.

According to an embodiment, the processor 210 may adjust the size of the background, thereby applying a frame effect to the image. The processor 210 may adjust the size of the frame, based on the size and/or position of an area (e.g., face) related to the object (e.g., a person). The processor 210 may apply a color effect and/or a frame effect for the determined background to the at least one determined image from which the color value of the background was removed.

In step 750 according to an embodiment, the processor 210 may display at least one image stored during the recording in a first area 751 of the display 110 and display a plurality of images in a second area 753 thereof. Images stored during the recording, images obtained by applying color effects and/or frame effects to the stored images, and videos stored during the recording may be displayed in the second area 753.

Figure 8:
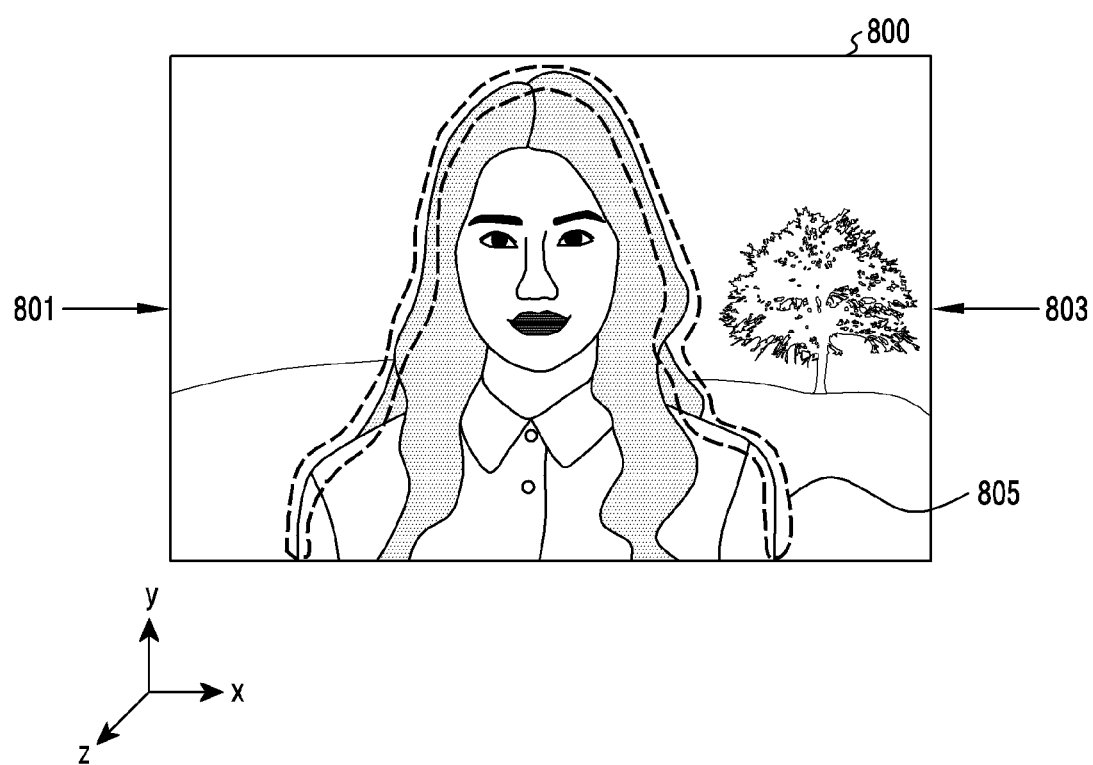
FIG. 8 illustrates an image in which a new light source effect is applied to an object detected in an electronic device according to an embodiment.

FIG. 8 illustrates an image in which a new light source effect is applied to an object detected in an electronic device according to an embodiment.

FIG. 8 shows the state in which a virtual light source effect is applied to an object included in an image 800. The virtual light source effect may be different from the light source environment for photographing. The processor 210 may increase the intensity of a light source for the object in the image 800 or change the direction of a light source, thereby producing images of various presentations. For example, the processor 210 may apply a light source effect in a first direction 801, apply a light source effect in a second direction 803, or apply a light source effect in a contour direction 805 of the object.

Figure 9:
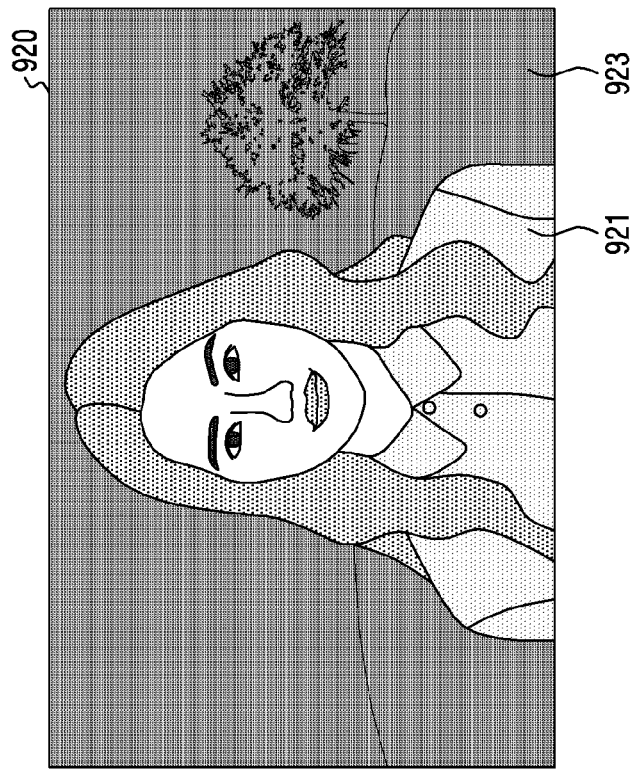
FIG. 9 illustrates an image to which an effect is applied in an electronic device according to an embodiment.
Figure 9:
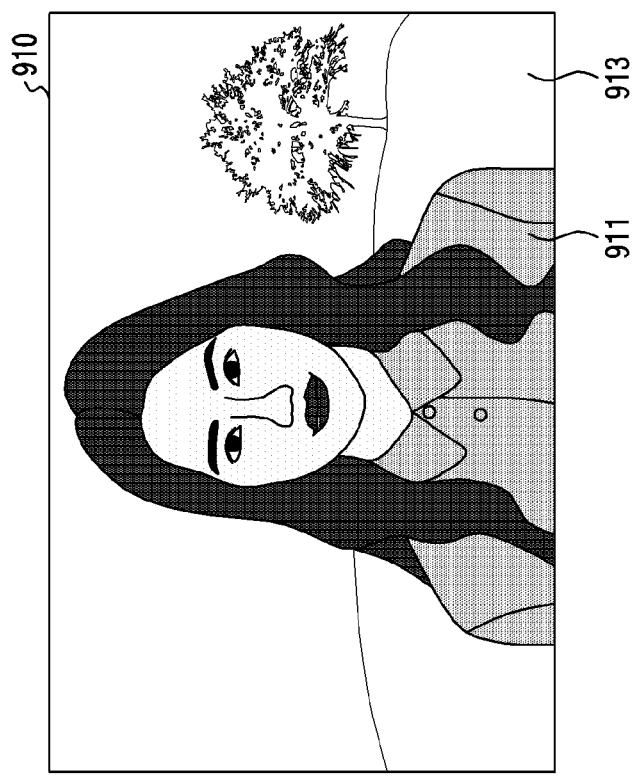

FIG. 9 illustrates an image to which an effect is applied in an electronic device according to an embodiment. An operating entity in FIG. 9 may be understood as a processor (e.g., the processor 210 in FIG. 2) or an image signal processor (e.g., the image signal processor 240 in FIG. 2).

Referring to FIG. 9, a first image 910 may be understood as a preview image or an image including a first object 911 and a first background 913 to which no virtual light source effect and color effect are applied. The second image 920 may be an image obtained by adjusting a brightness value of the first image 910. For example, the second image 920 may be an image including a second object 921 obtained by increasing the brightness value of the first object 911 and a second background 923 obtained by reducing the brightness value of the first background 913.

According to an embodiment, the processor 210 may detect a first object 911 in the first image 910. The processor 210 may separate the first object 911 and the first background 913 through a segmentation technique (e.g., upper body segmentation).

According to an embodiment, the processor 210 may increase a brightness value of a first object area corresponding to the first object 911. The processor 210 may increase a color value corresponding to the first object area. For example, the processor 210 may increase the brightness value by increasing all the R, G, and B values of the pixels corresponding to the first object area.

According to an embodiment, the processor 210 may reduce a brightness value of a first background area corresponding to the first background 913. The processor 210 may reduce a color value corresponding to the first background area. For example, the processor 210 may reduce the brightness value by reducing all the R, G, and B values of the pixels corresponding to the first background area.

According to an embodiment, the processor 210 may display, on the display 110, a second image 920 in which the brightness values of the object and background have been adjusted separately.

According to an embodiment, the processor 210 may apply a warm tone color to image data obtained through the camera 220. The processor 210 may apply a highlight effect by increasing a brightness value of the edge portion of an object detected based on the image data. The effect of applying a warm tone color to the entire image and increasing the brightness value of the edge portion of the object may be referred to as a halation effect.

According to an embodiment, the processor 210 may apply a black and white effect to image data obtained through the camera 220. The processor 210 may apply a high-key mono black and white effect to the obtained image data. The processor 210 may apply a low-key mono black and white effect to the obtained image data.

Figure 10:
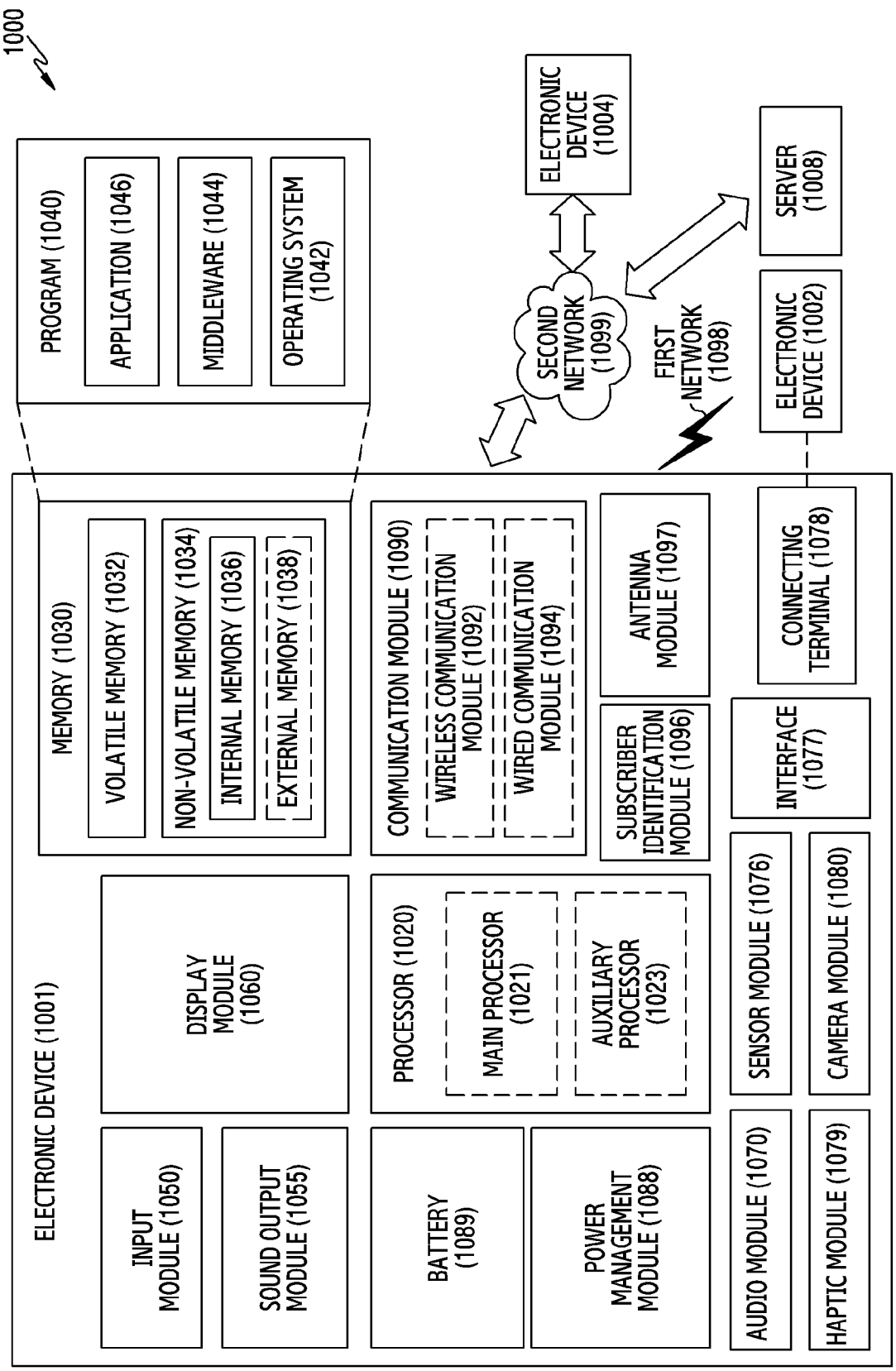
FIG. 10 is a block diagram of an electronic device in a network environment according to various embodiments.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thererto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 11:
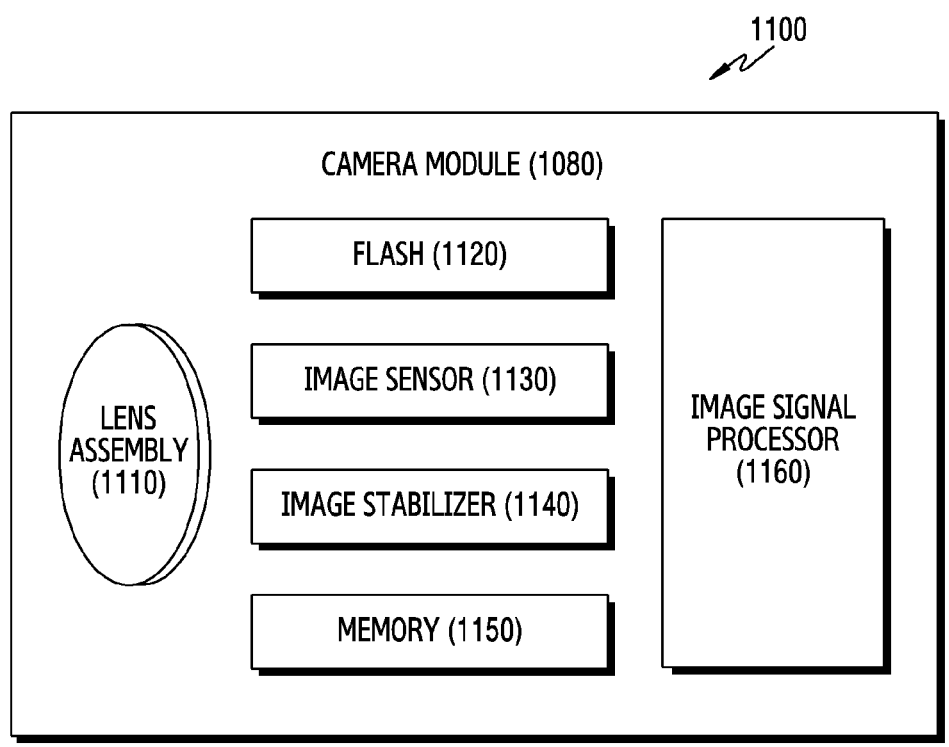
FIG. 11 is a block diagram illustrating a camera module according to various embodiments.

FIG. 11 is a block diagram 1100 illustrating the camera module 1080 according to various embodiments.

Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer. The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080.

According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

In various embodiments, an electronic device 100 may include a camera 220 and at least one processor (e.g., the processor 210 in FIG. 2) electrically connected to the camera 220. The at least one processor may execute the camera 220, detect at least one object, based on image data obtained through the camera in a first light source environment, analyze color properties of the at least one detected object, determine a first effect, based on the analyzed color properties of the object, apply a second light source effect different from the first light source to the at least one object, and apply the first effect to a background, excluding the at least one object.

According to an embodiment, the at least one processor (e.g., the processor 210 in FIG. 2) may remove an effect of the first light source from the at least one object and apply the second light source effect different from the first light source thereto.

According to an embodiment, the at least one processor (e.g., the processor 210 in FIG. 2) may apply the second light source effect to the object if a size of a face of the at least one object is greater than or equal to a first size and if an angle of the face of the object is less than or equal to a first angle in yaw, roll, and pitch directions.

According to an embodiment, the at least one processor (e.g., the processor 210 in FIG. 2) may obtain a photographing input of a user, obtain at least a first image and a second image in response to the photographing input, apply a first light source effect to the first image, apply the second light source effect to the at least one object of the second image, apply the first effect to the background of the second image, and display the first image and the second image on a display.

According to an embodiment, the at least one processor (e.g., the processor 210 in FIG. 2) may compare a second color value of the second light source effect with a first color value of the first effect. The at least one processor (e.g., the processor 210 in FIG. 2), based on the comparison, if a difference between the color values is equal to or less than a first value, may change a brightness value of at least one of the second light source effect and the first effect.

According to an embodiment, the at least one processor (e.g., the processor 210 in FIG. 2) may apply a contour light effect, in response to detection of a brightness value of the image data, to the at least one object if the brightness value is less than a first brightness value and change and apply the brightness value as a light source effect if the brightness value is greater than or equal to the first brightness value.

According to an embodiment, the at least one processor (e.g., the processor 210 in FIG. 2) may analyze the properties of the first light source by analyzing image data obtained through the camera 220. The at least one processor (e.g., the processor 210 in FIG. 2) may determine a direction and an intensity of the first light source, based on the analysis, and determine the second light source effect, based on the direction and intensity of the first light source.

According to an embodiment, the at least one processor (e.g., the processor 210 in FIG. 2) may further apply a gradation effect to the background, based on the direction of a light source.

According to an embodiment, the at least one processor (e.g., the processor 210 in FIG. 2) may apply a frame effect to an outer portion of the image data, based on at least one of a size and a position of an area related to the at least one object.

According to an embodiment, the at least one processor (e.g., the processor 210 in FIG. 2) may separate the object and the background through a segmentation technique (e.g., upper body segmentation).

In various embodiments, a method of operating an electronic device 100 may include executing a camera 220, detecting at least one object, based on image data obtained through the camera 220 in a first light source environment, analyzing color properties of the at least one detected object, determining a first effect, based on the analyzed color properties of the object, applying a second light source effect different from the first light source to the at least one object, and applying the first effect to a background, excluding the at least one object.

According to an embodiment, the method of operating an electronic device 100 may include removing an effect of the first light source from the at least one object and applying the second light source effect different from the first light source thereto.

According to an embodiment, the method of operating an electronic device 100 may include applying the second light source effect to the object if a size of a face of the at least one object is greater than or equal to a first size and if an angle of the face of the object is less than or equal to a first angle in yaw, roll, and pitch directions.

According to an embodiment, the method of operating an electronic device 100 may include obtaining a photographing input of a user, obtaining at least a first image and a second image in response to the photographing input, applying a first light source effect to the first image, applying the second light source effect to the at least one object of the second image, applying the first effect to the background of the second image, and displaying the first image and the second image on a display.

According to an embodiment, the method of operating an electronic device 100 may include comparing a second color value of the second light source effect with a first color value of the first effect and, based on the comparison, if a difference between the color values is equal to or less than a first value, changing a brightness value of at least one of the second light source effect and the first effect.

In various embodiments, an electronic device 100 may include a camera 220 and at least one processor electrically connected to the camera 220. The at least one processor (e.g., the processor 210 in FIG. 2) may execute the camera 220, detect at least one object, based on image data obtained through the camera in a first light source environment, analyze properties of the at least one detected object, determine at least one or more light source effects, based on the analyzed properties of the object, apply a second light source effect different from the first light source to the at least one object, and apply a third light source effect different from the second light source effect to a background, excluding the at least one object.

According to an embodiment, the at least one processor (e.g., the processor 210 in FIG. 2) may separate the object and the background through a segmentation technique (e.g., upper body segmentation).

According to an embodiment, the at least one processor (e.g., the processor 210 in FIG. 2) may determine the third light source effect, based on at least one of the properties of the object and the second light source effect.

According to an embodiment, the second light source may be different from at least one of the intensity of the first light source and the direction of the first light source.

According to an embodiment, the at least one processor (e.g., the processor 210 in FIG. 2) may increase a brightness value of an area corresponding to the at least one object and reduce a brightness value of an area corresponding to the background.

What is claimed is:

1. An electronic device comprising:
   a camera;
   memory storing computer-executable instructions; and
   at least one processor electrically connected to the camera and comprising processing circuitry,
   wherein the instructions cause, when being executed by the at least one processor, the electronic device to:
   execute the camera;
   detect at least one object, based on image data obtained through the camera in a first light source environment comprising a first light source;
   analyze color properties of the at least one detected object;
   determine a first effect, based on the analyzed color properties of the at least one detected object, wherein the first effect comprises a first light source effect corresponding to the first light source;
apply a second light source effect comprising a relighting effect corresponding to a second light source different from the first light source to the at least one object, wherein the second light source comprises a virtual light source having properties different from the first light source; and
apply the first effect to a background, excluding the at least one object.

2. The electronic device of claim 1, wherein the at least one processor is configured to remove an effect of the first light source from the at least one object and apply the second light source effect different from the first light source to the at least one object.

3. The electronic device of claim 1, wherein the at least one processor is configured to apply the second light source effect to the at least one object in response to a size of a face of the at least one object being greater than or equal to a first size and in response to an angle of the face of the object being less than or equal to a first angle in yaw, roll, and pitch directions.

4. The electronic device of claim 1, wherein the at least one processor is configured to:
obtain a photographing input of a user;
obtain at least a first image and a second image in response to the photographing input;
apply the first light source effect to the first image;
apply the second light source effect to the at least one object of the second image;
apply the first effect to the background of the second image; and
display the first image and the second image on a display.

5. The electronic device of claim 1, wherein the at least one processor is configured to compare a second color value of the second light source effect with a first color value of the first effect and, based on the comparison, in case that a difference between the second color value and the first color value is equal to or less than a first value, change a brightness value of at least one of the second light source effect and the first effect.

6. The electronic device of claim 1, wherein the at least one processor is configured to, in response to detection of a brightness value of the image data:
apply a contour light effect to the at least one object in response to the brightness value being less than a first brightness value; and
in response to the brightness value being greater than or equal to the first brightness value, change and apply the brightness value as a light source effect.

7. The electronic device of claim 1, wherein the at least one processor is configured to:
analyze properties of the first light source by analyzing image data obtained through the camera;
determine a direction and an intensity of the first light source, based on the analysis; and
determine the second light source effect, based on the direction and intensity of the first light source.

8. The electronic device of claim 1, wherein the at least one processor is configured to apply a gradation effect to the background, based on a direction of at least one of the first light source and the second light source.

9. The electronic device of claim 8, wherein the at least one processor is configured to apply a frame effect to an outer portion of the image data, based on at least one of a size and a position of an area related to the at least one object.

10. The electronic device of claim 1, wherein the at least one processor is configured to separate the object and the background through upper body segmentation.

11. A method of operating an electronic device, the method comprising:
executing a camera;
detecting at least one object, based on image data obtained through the camera in a first light source environment;
analyzing color properties of the at least one detected object;
determining a first effect, based on the analyzed color properties of the at least one detected object, wherein the first effect comprises a first light source effect corresponding to the first light source;
applying a second light source effect comprising a relighting effect corresponding to a second light source different from the first light source to the at least one object, wherein the second light source comprises a virtual light source having properties different from the first light source; and
applying the first effect to a background, excluding the at least one object.

12. The method of claim 11, further comprising:
removing an effect of the first light source from the at least one object; and
applying the second light source effect different from the first light source to the at least one object.

13. The method of claim 11, further comprising applying the second light source effect to the at least one object in response to a size of a face of the at least one object being greater than or equal to a first size and in response to an angle of the face of the object being less than or equal to a first angle in yaw, roll, and pitch directions.

14. The method of claim 11, further comprising:
obtaining a photographing input of a user;
obtaining at least a first image and a second image in response to the photographing input;
applying the first light source effect to the first image;
applying the second light source effect to the at least one object of the second image;
applying the first effect to the background of the second image; and
displaying the first image and the second image on a display.

15. The method of claim 11, further comprising:
comparing a second color value of the second light source effect with a first color value of the first effect; and
based on the comparison, in response to a difference between the second color value and the first color value being equal to or less than a first value, changing a brightness value of at least one of the second light source effect and the first effect.

16. An electronic device comprising:
a camera;
memory storing computer-executable instructions; and
at least one processor electrically connected to the camera and comprising processing circuitry,
wherein the instructions cause, when being executed by the at least one processor, the electronic device to:
execute the camera,
detect at least one object based on image data obtained through the camera in a first light source environment comprising a first light source,
analyze properties of the at least one detected object,
determine at least one light source effect based on the analyzed properties of the at least one detected object, apply, to the at least one detected object, a first light source effect corresponding to a second light source different from the first light source, wherein the second light source comprises a virtual light source having properties different from the first light source, apply, to a background excluding the at least one detected object, a second light source effect which is different from the first light source effect.

17. The electronic device of claim 16,
wherein the at least one processor is configured to separate the at least one detected object and the background through upper body segmentation.

18. The electronic device of claim 16,
wherein the at least one processor is configured to determine the second light source effect based on at least one of the properties of the at least one detected object or the first light source effect.

19. The electronic device of claim 16,
wherein the second light source is different from the first light source in at least one of intensity or direction.

20. The electronic device of claim 16,
wherein the at least one processor is configured to increase a brightness value of an area corresponding to the at least one detected object, and decrease a brightness value of an area corresponding to the background.

* * * * *